United States Patent
Ruokanen et al.

(10) Patent No.: US 10,941,082 B2
(45) Date of Patent: Mar. 9, 2021

(54) GLAZE FOR A CERAMIC ARTICLE

(71) Applicant: PPC INSULATORS AUSTRIA GMBH, Vienna (AT)

(72) Inventors: Markku Ruokanen, Lausanne (CH); Juergen Hoffmann, Nuremberg (DE)

(73) Assignee: PPC AUSTRIA HOLDING GMBH, Vienna (AT)

( * ) Notice: Subject to any disclaimer, the term of this patent is extended or adjusted under 35 U.S.C. 154(b) by 0 days.

(21) Appl. No.: 16/347,308

(22) PCT Filed: Nov. 6, 2017

(86) PCT No.: PCT/AT2017/000074
§ 371 (c)(1),
(2) Date: May 3, 2019

(87) PCT Pub. No.: WO2018/081841
PCT Pub. Date: May 11, 2018

(65) Prior Publication Data
US 2019/0276373 A1   Sep. 12, 2019

(30) Foreign Application Priority Data
Nov. 4, 2016 (AT) .................................. A507/2016

(51) Int. Cl.
| | | |
|---|---|---|
| *C04B 41/50* | (2006.01) | |
| *C04B 41/86* | (2006.01) | |
| *C04B 41/00* | (2006.01) | |
| *C04B 35/18* | (2006.01) | |
| *C04B 35/622* | (2006.01) | |
| *H01B 3/12* | (2006.01) | |
| *C04B 33/26* | (2006.01) | |
| *C04B 33/34* | (2006.01) | |
| *H01B 19/04* | (2006.01) | |
| *C04B 111/20* | (2006.01) | |
| *C04B 111/92* | (2006.01) | |

(52) U.S. Cl.
CPC .......... *C04B 41/5022* (2013.01); *C04B 33/26* (2013.01); *C04B 33/34* (2013.01); *C04B 35/18* (2013.01); *C04B 35/62222* (2013.01); *C04B 41/009* (2013.01); *C04B 41/86* (2013.01); *H01B 3/12* (2013.01); *H01B 19/04* (2013.01); *C04B 2111/2069* (2013.01); *C04B 2111/92* (2013.01); *C04B 2235/349* (2013.01); *C04B 2235/3418* (2013.01); *C04B 2235/3427* (2013.01); *C04B 2235/3445* (2013.01); *C04B 2235/3454* (2013.01); *C04B 2235/3463* (2013.01); *C04B 2235/386* (2013.01); *C04B 2235/422* (2013.01); *C04B 2235/446* (2013.01)

(58) Field of Classification Search
CPC ... C04B 41/5022; C04B 41/009; C04B 41/86; C04B 33/26; C04B 33/34; C04B 35/62222; H01B 3/12; H01B 19/04
USPC ........................................................ 428/446
See application file for complete search history.

(56) References Cited

U.S. PATENT DOCUMENTS

| | | | |
|---|---|---|---|
| 3,982,048 A | 9/1976 | Zlupko | |
| 5,284,712 A | 2/1994 | Kawai et al. | |
| 2011/0210282 A1* | 9/2011 | Foley ................... | B82Y 25/00 |
| | | | 252/62.51 R |

FOREIGN PATENT DOCUMENTS

| | | |
|---|---|---|
| AT | 1124237 | 8/2001 |
| EP | 2618341 | 7/2013 |
| WO | 95/18076 | 7/1995 |

OTHER PUBLICATIONS

Pumera et al., "Graphane and hydrogenated graphene," May 20, 2013, Chem Soc Rev, URL: <https://pubs.rsc.org/en/content/articlepdf/2013/cs/c3cs60132c>, pp. Title Page, 5987-5995 (Year: 2013).*
International Search Report from corresponding PCT Appln. No. PCT/AT2017/000074 dated Jan. 25, 2018.
Written Opinion from corresponding PCT Appln. No. PCT/AT2017/000074 dated Jan. 25, 2018.
Reinosa et al., "Inorganic hydrophobic coatings: Surfaces mimicking the nature", Ceramics International vol. 39 No. 3, Apr. 2013, pp. 2489-2495.

* cited by examiner

*Primary Examiner* — Humera N. Sheikh
*Assistant Examiner* — Katherine A Christy
(74) *Attorney, Agent, or Firm* — Grossman, Tucker, Perreault & Pfleger, PLLC

(57) ABSTRACT

The glaze is prepared from the following raw materials in percentage by weight: Fire Clay 10%-25%, Feldspar 30%-40%, Sand 30%-40%, Calcium Silicate 8%-12%, Graphane (i.e., disordered crystalline and hydrogenated double bounded Carbon) 5%-15% or C-doped Boron Nitride (CBN) 5%-15%, various metal oxides as pigments and water. This glaze is applied on the standard glazing operation in the ceramic insulator manufacturing process and is fired in a controlled inert-gas atmosphere.

19 Claims, No Drawings

GLAZE FOR A CERAMIC ARTICLE

The present invention relates to a glaze for a ceramic article.

The pollution is the main concern on the high voltage sub-station dependent on ceramic insulators. Conductive air-born particles are posing on the insulator surface and causing a flashover which will damage the insulators. In worst case, the sub-station is shut-down and provokes a black-out in the grid. Potential damages can easily be several millions of euros.

The utilities are having a preventive maintenance program to clean the insulators, but in polluted areas the cleaning must be done every 6 months or even more often. The insulator cleaning is a heavy burden for the utilities. It is expensive as a labor-intensive work and as for safety reasons the power must be turned off, which is as well causing financial losses.

Therefore, the utilities and energy segment have a great interest for the self-cleaning surfaces. The classical solution is a composite insulator with silicon sheds which is hydrophobic. Another way to increase the cleaning intervals is the RTV-coating (Room Temperature Vulcanization), liquid silicon sprayed on the porcelain surface. In recent years the research has focused on different coatings technologies trying to create a Lotus-effect or using hydrophobic nanoparticles.

All these technologies are having the weak point being a coating where the life-time is the major issue. Substations are heavy infrastructure with a life time over decades. When the coating or silicon are aged and lost their characteristic the reparation is often not possible on field conditions or more expensive then replacement of the aged insulators.

Normally the porcelain is having high wettability, meaning that a water drop is not remaining a drop. There is also salt based pollution, which is soluble on the water. This type of pollution creates after drying the so called "Obenaus Dry Bands" on the surface of insulators. The earliest scientific explanations for contamination flashovers has been the theory proposed by Obenaus in the 1930s. A partial arc generated by dry band activity is in series with the contaminated section of the insulator and this is represented as a series resistance. Various factors are responsible for the partial arc to elongate and bridge enough of the insulator (roughly 50%) which will then provide the necessary impetus to result in a flashover. An increase in contamination severity on the insulator is one factor that contributes to flashover.

EP 1 124 237 A2 discloses a glazed ceramic article. The glaze layer comprises $SiO_2$ and $Al_2O_3$ and does not show a feature of acting hydrophobic or self-cleaning.

U.S. Pat. No. 5,284,712 describes a cement-containing ceramic article comprising a glaze layer of 40% Feldspar, 10% Calcium Carbonate, 5% Zinc Oxide, 25% Talc, 10% Silica Sand and 10% Silica-containing Kaoline. This glaze does not have efflorescence, however, it is not designed to act hydrophobic or self-cleaning.

It is accordingly an object of the present invention to provide a glaze being easy and cheap to manufacture, leading to ceramic bodies such as high voltage insulators having a hydrophobic and/or self-cleaning surface.

It is a further object of the present invention to provide a charged surface glaze for outdoor ceramic insulators in high voltage application (>1000 V).

To accomplish the above objects, there is provided according to an aspect of the present invention a glaze comprising as main component 5-15 Graphane or C-doped Boron Nitride.

In a further embodiment the glaze comprises as main components:
5%-25% Fire Clay,
30%-40% Feldspar,
17%-40% Sand,
8%-23% Silicate,
5%-15% Graphane or C-doped Boron Nitride.

In yet another preferred embodiment the glaze comprises as main components: 10%-25% Fire Clay, 30%-40% Feldspar, 30%-40% Sand, 8%-12% Calcium Silicate, 5%-15% Graphane. Instead of Graphane, 5%-15% C-doped Boron Nitride may be used.

In a further embodiment of the invention the glaze comprises:
5-7.5% Fire Clay,
30-38% Feldspar 75K20 & 55NaK60,
17-22% Quartz sand,
5-7.5% Wollastonite,
2.5-4.7% Soapstone calcined DIN100,
7-10.5% $ZrSiO_4$,
0.8-3.8% Calcite Carolith,
5-7.5% Chamotte,
5-15% Graphane or C-doped Boron Nitride,
whereas China Clay is a special type of Fire Clay, Wollastonite is $CaSiO_3$, and Calcite is provided in 0-0.2 VA grinding grade. Wollastonite, Soapstone and ZrSiO4 are silicates (Soapstone, moreover is layered silicate).

In yet another embodiment of the present invention the glaze furthermore comprises metal oxides as pigments and water, whereas metal oxides are $Fe_2O_3$, $Cr_2O_3$, MnO, NiO, CoO, $ZrO_2$ or $TiO_2$. Further metal oxides may be explored.

The invention relates to a new type of ceramic glaze having a charged surface giving the water and particle repelling characteristic as well as a preparation method and manufacturing thereof and belongs to the technical field of improvement of ceramic high voltage insulators.

The new glaze is prepared from the following raw materials in percentage by weight: Fire Clay 10%-25%, Feldspar 30%-40%, Sand 30%-40%, Calcium Silicate 8%-12%, disordered crystalline and hydrogenated double bonded Carbon (Graphane) 5-15% or Carbon-Boron-Nitride 5-15%, various metal oxides as pigments and water. This glaze is applied on the standard glazing operation in the ceramic insulator manufacturing process and is fired in a controlled inert-gas atmosphere.

The new glaze with charged surface is repelling water and pollution particles, which gives improved performance in highly polluted conditions as the "Obenaus Dry Band" creation is decreasing. This will reduce the risk of flashover in service and the need of cleaning. The new glaze is itself self-cleaning meaning that the risk of peeling or aging observed with various coatings is avoided. Thus, the expected lifetime is equivalent of a ceramic insulator.

The innovation is to dope the glaze receipt in a way that the glaze itself achieves water-repelling surface on the normal single firing process of the porcelain insulators industry. This would create a self-cleaning effect in the rain when the rain-drops are rolling on the insulator surface taking particles with them. This would as well eliminate all adhesion related problems with the coatings and aging issues of the silicon under the sun. The innovation is very cost effective as existing industrial kilns can be used.

Doping substances, known as hydrophobic materials, supporting the firing process up to 1300° C. can be used. Materials having hexagonal microstructure like Graphane or C-doped Boron Nitride (or Carbon Boron Nitride or CBN, here, showing the structure of hexagonal Boron Nitride, h-BN) would both work.

Graphene is disordered crystalline and hydrogenated double bonded Carbon. It is highly conductive, and therefore not suitable for our purposes, owing it to its very well-ordered crystalline structure and presence of double bonds (C═C bonds) which act as a high way for the free-electrons. This structure has $Sp^2$ hybridization. Upon hydrogenation of Graphene, a new compound will be produced. In this new compound known also as Graphane or hydrogenated Graphene, the C═C double bond will be opened and hybridization will be altered to $Sp^3$. This graphene-based compound is disordered and insulator since there are no C═C double bonds any more in its structure. Bottom line is that a hydrogenated graphene is insulator and can be used as isolator.

Hexagonal Boron Nitride (h-BN), a layered material like graphite, is a promising dielectric. Monolayer h-BN, so-called "white graphene", due to its similar planar hexagonal structure and lubricious characteristics, is a hard-ceramic material with high thermal conductivity and good thermal shock resistance. Unlike graphite it is an electrical insulator and although not as easy to machine as the machinable ceramics it is superior to other traditional ceramics in this respect. In this context C-doped h-BN is preferably used.

The term "sand" pertains to conventional sand types used in this technical area such as silica sand or Quartz sand.

Here, glaze means composition to form a final glaze on a body. In a more specific example, the following method is used to establish the glaze:

| | |
|---|---|
| China Clay | 6-8%, |
| Feldspar 75K20 & 55NaK60 | 36-40%, |
| Quartz sand | 20-23%, |
| Wollastonite | 6-8%, |
| Soapstone calcined DIN100 | 3-5%, |
| Calcite Carolith | 1-4%, |
| Chamotte | 6-8%, |
| $ZrSiO_4$ | 8-11% and |
| Pigments & Anti-sedimentation agent | Rest | are milled to and mixed with about 40% per weight water with following tolerance for the particle size distribution:
D90 μm: 24.0±2.0,
D50 μm: 5.5±0.5,
D10 μm: 0.9±0.1,
Mean diameter μm: 9.3±1,
Bulk density (liter weight) $kg/m^3$: 1620±20,
Dry content % per weight: 60.5±2.0.

Anti-sedimentation agent is carboxy-methyl-cellulose (CMC). On this liquid glaze, the doping substance Graphane or C-doped Boron Nitride is added on emulsion to form the wanted quantity of 5-15%.

The final values then are:
5-7.5% Fire Clay,
30-38% Feldspar 75K20 & 55NaK60,
17-22% Quartz sand,
5-7.5% Wollastonite,
2.5-4.7% Soapstone calcined DIN100,
7-10.5% $ZrSiO_4$,
0.8-3.8% Calcite Carolith,
5-7.5% Chamotte,
5-15% Graphane or C-doped Boron Nitride.

The doped glaze is applied on a ready turned and dried porcelain body by an industrial spraying-pistol, as alternative the dipping method can be applied. After glazing the insulators are directly fired on Nitrogen atmosphere following the normal firing curb.

The innovation gives multiple advantages. The main point is that existing industrial equipment can be used without or only with minor modifications. The glaze doping is working on the different types of glazes used in porcelain industry. The whole process is very cost effective, and even when the doping substances are rather expensive, the glaze is only 1% of the total weight of the insulator, and the doping substance is <10% of the glaze, which is diluting the cost increase.

As the Graphene particles are imbedded on the glaze, they will remain on place and there will be no peeling effects. The aging behavior should be the same as with the normal glaze, after one year no changes have been observed.

What is claimed is:

1. A glaze composition for a ceramic article, comprising: 5 wt %-15 wt % Graphane in the glaze composition.

2. The glaze composition for a ceramic article according to claim 1, further comprising:
5 wt %-25 wt % Fire Clay in the glaze composition;
30 wt %-40 wt % Feldspar in the glaze composition;
17 wt %-40 wt % Sand in the glaze composition; and
8 wt %-23 wt % Silicate in the glaze composition.

3. The glaze composition for a ceramic article according to claim 1, further comprising:
10 wt %-25 wt % Fire Clay in the glaze composition;
30 wt %-40 wt % Feldspar in the glaze composition;
30 wt %-40 wt % Sand in the glaze composition; and
8 wt %-12 wt % Calcium Silicate in the glaze composition.

4. The glaze composition for a ceramic article according to claim 1, further comprising:
5 wt %-7.5 wt % Fire Clay in the glaze composition;
30 wt %-38 wt % Feldspar 75K20 & 55NaK60 in the glaze composition;
17 wt %-22 wt % Quartz sand in the glaze composition;
5 wt %-7.5 wt % Wollastonite in the glaze composition;
5 wt %-4.7 wt % Soapstone calcined DIN100 in the glaze composition;
7 wt %-10.5 wt % ZrSiO4 in the glaze composition;
0.8 wt %-3.8 wt % Calcite Carolith in the glaze composition; and
5 wt %-7.5 wt % Chamotte in the glaze composition.

5. The glaze composition according to claim 1, further comprising:
at least one of a metal oxide and a pigment.

6. A ceramic article comprising:
a surface glaze made of a glaze composition, wherein the glaze composition comprises 5 wt %-15 wt % Graphane.

7. The ceramic article according to claim 6, wherein the ceramic article comprises a ceramic isolator.

8. The ceramic article according to claim 7, wherein the ceramic insulator is a high-voltage ceramic isolator.

9. The ceramic article according to claim 8, wherein the high-voltage ceramic isolator accommodates voltages greater than 1,000 volts.

10. The ceramic article according to claim 6, wherein the ceramic article comprises porcelain.

11. The ceramic article according to claim 6, wherein the surface glaze comprises a water-repelling surface.

12. The ceramic article according to claim 6, wherein the surface glaze comprises hydrophobic surface.

13. The ceramic article according to claim 6, wherein the glaze composition further comprises
   5 wt %-25 wt % Fire Clay in the glaze composition;
   30 wt %-40 wt % Feldspar in the glaze composition;
   17 wt %-40 wt % Sand in the glaze composition; and
   8 wt %-23 wt % Silicate in the glaze composition.

14. The ceramic article according to claim 6, wherein the glaze composition further comprises
   10 wt %-25 wt % Fire Clay in the glaze composition;
   30 wt %-40 wt % Feldspar in the glaze composition;
   30 wt %-40 wt % Sand in the glaze composition; and
   8 wt %-12 wt % Calcium Silicate in the glaze composition.

15. The ceramic article according to claim 6, wherein the glaze composition further comprises
   5 wt %-7.5 wt % Fire Clay in the glaze composition;
   30 wt %-38 wt % Feldspar 75K20 & 55NaK60 in the glaze composition;
   17 wt %-22 wt % Quartz sand in the glaze composition;
   5 wt %-7.5 wt % Wollastonite in the glaze composition;
   5 wt %-4.7 wt % Soapstone calcined DIN100 in the glaze composition;
   7 wt %-10.5 wt % ZrSiO4 in the glaze composition;
   0.8 wt %-3.8 wt % Calcite Carolith in the glaze composition; and
   5 wt %-7.5 wt % Chamotte in the glaze composition.

16. The ceramic article according to claim 6, wherein the glaze composition further comprises at least one of a metal oxide and a pigment.

17. The ceramic article according to claim 16, wherein the metal oxide is at least one of $Fe_2O_3$, $Cr_2O_3$, MnO, NiO, CoO, $ZrO_2$ and $TiO_2$.

18. The glaze composition according to claim 5, wherein the metal oxide is at least one of $Fe_2O_3$, $Cr_2O_3$, MnO, NiO, CoO, $ZrO_2$ and $TiO_2$.

19. The glaze composition according to claim 1, further comprising water.

* * * * *